(12) United States Patent
Stewart et al.

(10) Patent No.: US 6,714,964 B1
(45) Date of Patent: Mar. 30, 2004

(54) SYSTEM, METHOD AND RECORDABLE MEDIUM FOR PRINTING SERVICES OVER A NETWORK

(75) Inventors: Jeff Stewart, New York, NY (US); Jennifer R. Pinco, NY, NY (US); David Uyttendaele, NY, NY (US); Craig Jacobs, Patterson, NY (US); Doug Fink, NY, NY (US); Sean Roberts, West Orange, NY (US)

(73) Assignee: Mimeo.com, New York, NY (US)

( * ) Notice: Subject to any disclaimer, the term of this patent is extended or adjusted under 35 U.S.C. 154(b) by 0 days.

(21) Appl. No.: 09/709,393

(22) Filed: Nov. 13, 2000

Related U.S. Application Data

(60) Provisional application No. 60/164,723, filed on Nov. 12, 1999, provisional application No. 60/165,643, filed on Nov. 15, 1999, and provisional application No. 60/165,651, filed on Nov. 15, 1999.

(51) Int. Cl.[7] .............................................. G06F 15/16
(52) U.S. Cl. ....................... 709/203; 709/206; 709/218; 709/219; 707/526; 707/527
(58) Field of Search ................................ 709/203, 201, 709/206, 218, 219; 707/526, 527, 200; 705/59, 55, 58, 26, 52, 57, 412, 77, 8; 380/281; 349/5.74

(56) References Cited

U.S. PATENT DOCUMENTS

| | | | |
|---|---|---|---|
| 5,559,933 A | | 9/1996 | Boswell |
| 5,873,073 A | * | 2/1999 | Bresnan et al. ............. 705/410 |
| 5,956,483 A | | 9/1999 | Grate et al. |
| 5,963,216 A | * | 10/1999 | Chiarabini et al. |
| 6,003,069 A | | 12/1999 | Cavill |
| 6,012,068 A | | 1/2000 | Boezeman et al. |
| 6,020,972 A | | 2/2000 | Mahoney et al. |
| 6,055,566 A | | 4/2000 | Kikinis |
| 6,073,147 A | * | 6/2000 | Chan et al. .................. 707/542 |
| 6,073,168 A | * | 6/2000 | Mighdoll et al. ........... 709/217 |
| 6,084,883 A | | 7/2000 | Norrell et al. |
| 6,125,372 A | * | 9/2000 | White |
| 6,134,568 A | * | 10/2000 | Tonkin ........................ 707/526 |
| 6,247,011 B1 | | 6/2001 | Jecha et al. |
| 6,330,067 B1 | * | 12/2001 | Murata |
| 2001/0055492 A1 | | 12/2001 | Wood et al. |

OTHER PUBLICATIONS

Since 1992, Xerox Production Printing Services, 2.3.04, Xerox Document Submission Application.
1998 by CAP Ventures "Electronic Print Job Submission".
"Xerox Year 2000 Product Compliance Status Product Details" from www.xerox.com Nov. 20, 2000.

* cited by examiner

*Primary Examiner*—Frantz B. Jean
(74) *Attorney, Agent, or Firm*—Ronald A. D'Alessandro; Hoffman, Warnick & D'Alessandro

(57) ABSTRACT

The invention generally relates to sending data (e.g. print data or a document), in a network environment, to a port monitor, and to upload the data to an upload manager for storing in a database. Relevant data may be sent from a print spooler to the port monitor invoking an upload manger to convey (e.g. securely or non-securely) print data to a web server. A version manager determines whether the print driver being used to print data is authentic, and data are written to a web server as packets of information and sent to a database for storage. Additionally, a system, method and recordable medium are recognized whereby a pass through (e.g. a port monitor filter) is inserted between a print spooler and a port monitor in order to detach the port monitor from the print spooler such that object code can be upgraded for future versions of software.

4 Claims, 14 Drawing Sheets

SYSTEM, METHOD AND RECORDABLE MEDIUM FOR PRINTING SERVICES OVER A NETWORK

BENEFIT OF EARLIER FILED APPLICATION

This application claims the benefit of U.S. Provisional Application No. 60/164,723, filed Nov. 12, 1999, U.S. Provisional Application No. 60/165,643, filed Nov. 15, 1999, and U.S. Provisional Application No. 60/165,651, filed Nov. 15, 1999.

TECHNICAL FIELD

The present invention relates to a system, method and recordable medium for receiving and transmitting data over a network, and in particular, to receiving and transmitting print data from a print spooler via a port monitor and upload manager to a web server.

BACKGROUND ART

Photocopying and reproduction services have been around since the turn of the century. These services traditionally include a variety of competition ranging from internal copy centers and network printers to outsourced and quick copy centers. These photocopying and reproduction services are used in a wide variety of commercial and non-commercial businesses. For example, publishers, firms, universities, sales professionals, training professionals, international consumers, corporations, individuals, sole proprietors, mobile offices, home offices, business travelers and content producers all utilize photocopying and reproduction services.

Internal copy centers may be found, for example, in many businesses. Internal copy centers typically handle photocopying and reproduction for personnel internal to a specific business. These copy centers are, however, often overburdened with the amount of material that they are required to produce, and are often under-staffed and limited in the number of machines that can perform the services. They are also often unreliable to users, require supervision, are often not available after certain hours and do not deliver the package after the services have been completed.

Local network printers, such as a printer attached to a personal computer, are also widely used as a photocopy and reproduction service. Local network printers often suffer from problems such as running out of toner, being in an inconvenient location, very little if any color capability, a lack of confidentiality, and no binding, stapling or shipping.

Outsourced copy centers function similar to internal copy centers except that they are run by an outside copy service. Hence, the problems associated with an internal copy center are similarly attributable to outside copy centers. In addition, the consumer must now associate with persons outside of their business. As is often the case, the exchange of information (i.e. getting the material to the outsourced service, conveying the method of binding, etc.) is miscommunicated and/or not properly conveyed. Quick copy centers (a specific kind of outsourced copy center), such as Kinko's®, Sir Speedy® and KwikCopy®, enable consumers to copy, reproduce and bind. However, these centers have the disadvantages of inconsistent quality and service between stores, inconsistent service offerings, diluted brands, and inconvenient locations.

FIG. 1 illustrates a conventional process that a consumer must follow in order to copy or reproduce a document using, for example, the above noted copy centers. First, the consumer must save the document to disk. Then the consumer must walk to the copy center and wait in line for access to a computer and printer. An order must then be placed, and the consumer must wait for the order to be printed. Once the order has been printed, the consumer must then place the order for copy services, wait for a first copy to preview the document, confirm the order, walk back to the office, wait for copies to finish printing, walk back to the copy center and wait in line to pick up the copies. Finally, the copies must be sent to their final destination by some form of mail delivery. As explained above and by the Quick Copy Center diagram, the process is time consuming and lengthy.

As noted above, copy centers do not afford the consumer the ability to preview a document prior to completion of the service. For example, a consumer cannot view either the document as a whole or parts of the document, such as the font of the document, the binding and/or the color of the cover, until after completion of the entire photocopying and reproduction process. Hence, if the completed product is not satisfactory to the consumer, the entire process must be repeated. This not only increases the time for copying and reproduction, but also inevitably increases the costs to both the consumer and the service provider.

SUMMARY OF THE INVENTION

In one embodiment of the invention, there is a method for delivering a document on-line. The method includes, for example, uploading the document from a client to a storage unit, such as a web server, via the network, after print driver information is verified, and downloading the document form the storage unit to a facility for printing.

In one aspect of the invention, the network is the Internet.

In still another aspect of the invention, the method provides providing a print driver from an application residing on the client in order to print the document, authenticates the print driver by comparing information about the selected print driver with predetermined information, stores the document, including relevant document information, in the storage unit, and prints the document at the facility located at a location based on the relevant document information.

In another embodiment of the invention, there is a method for delivering a document over a network. The method includes, for example, providing a print driver to be selected by a user to print the document from an application residing on a client, and uploading the document from the client, using the selected print driver, to a web server via a network.

In one aspect of the invention, the method also includes launching an interface to view the document selected for delivery, downloading the document from the storage unit to a facility for delivery, and sending the document to a location designated by a user at the client.

In still another embodiment of the invention, there is a method for delivering a document over a network. The method includes, for example, receiving an uploaded document from a client and storing the document at the received location, and sending the document to a facility for delivery.

In yet another embodiment of the invention, there is a system for delivering a document over a network. The system includes, for example, a client having an application that allows a user to select a print driver for printing the document, wherein the print driver creates a print file from the document and the print file is uploaded over the network.

In one aspect of the invention, the system also includes, for example, a web server receiving the print file uploaded over the network, a delivery facility to receive the document downloaded from the network, and an upload manager launching a web browser for viewing the document on the client.

In still another embodiment of the invention, there is a system for delivering a document over a network. The system includes, for example, an upload manager to upload the document from a client to a storage unit, via a network, after print driver information is verified, a printing facility, accessible via the network, receiving the document downloaded form the storage unit for printing.

In yet another embodiment of the invention, there is a system for delivering a document over a network. The system includes, for example, an interface on a client to download a print driver from the network, the print driver creating a print file from the document, an authentication manager to verify that the print driver is valid by comparing predetermined information with components of the print driver stored in the print file, an upload manager, residing on the client, launching the interface for viewing the document, a web server to receive the print file uploaded from the client, the print file including file information, and a printing facility downloading the print file from the web server and delivering the document to a specified address.

In one aspect of the invention, the file information includes at least one of a handle identifying the location of the printer, a printer name, a job id, a printing level, color information, binding information or other relevant document information.

In another embodiment of the invention, there is a system for delivering a document over a network. The system includes, for example, a client uploading the document to a web server via a network, after print driver information is verified, and a printing facility downloading the document from the web server for delivery.

In still another embodiment of the invention, there is a method for delivering a document over a network. The method includes, for example, downloading a print driver located on a client from the network, the print driver creating a print file from the document to upload over the network, verifying that the print driver is valid by comparing predetermined information with components of the print driver stored in the document, launching an interface for viewing the document, receiving the document uploaded from the client at a web server, the document including file information, and downloading the document from the web server and printing the document according at least to the file information.

In still another embodiment of the invention, there is a method for delivering a document over a network. The method includes, for example, receiving a request to print the document, building objects using a print driver such that the document can be communicated over the network as a print file, and uploading the print file from a client to a storage unit over the network.

In one aspect of the invention, the method further includes, for example, storing the document in the storage unit, downloading the document from the storage unit to a printing facility accessible via the network, and printing the document for delivery to a specified location.

In another embodiment of the invention, there is a computer readable medium including, for example, instructions thereon, the instructions, when executed by a processor, performing the function of providing a print driver to be selected by a user in order to print a document from an application residing on a client, and uploading the document from the client, using the selected print driver, to a storage unit via a network.

In yet another embodiment of the invention, there is a computer readable medium including, for example, instructions thereon, the instructions, when executed by a processor, performing the function of receiving a request to print a document, building objects using a print driver such that the document can be communicated over a network and uploading the document from a client to a storage unit over the network.

In another embodiment of the invention, there is a method for delivering a document over a network. The method includes, for example, uploading the document from a client to a web server via the network, and downloading the document from the web server to a facility for delivery.

In still another embodiment of the invention, there is a system for delivering a document. The system includes, for example, an upload manager to upload the document from a client to a web server, via a network, and a delivery facility, accessible via the network, receiving the document downloaded from the web server for delivery.

BRIEF DESCRIPTION OF THE DRAWINGS

The figures relate to a system, method and recordable medium of the present invention. They are merely illustrative in nature and do not limit the scope of invention to their disclosed embodiments.

DETAILED DESCRIPTION OF THE INVENTION

This invention supports an efficient system, method and recordable medium to copy or reproduce documents. A user may select various binding, formatting and payment options and preview the impact of such selections on a final document prior to the document being reproduced according to such selections. The system, method and recordable medium operates over a network, such as the Internet. Therefore, the user may be located anywhere in the world and request copying or reproduction of a document according to specific parameters, and may view the final document electronically before the final document is produced in a hard copy format. The user may change the document formatting and other options as desired with the preview feature. Such changes are performed in real-time from the user's computer and do not require the time and resources of a conventional copy center. Additionally, the user is not subject to waiting in line while copy center personnel handle previous requests placed by other consumers. Once an order has been placed to the reproduction system, the user can track the order to determine its status at any time during its processing.

Figure 1:
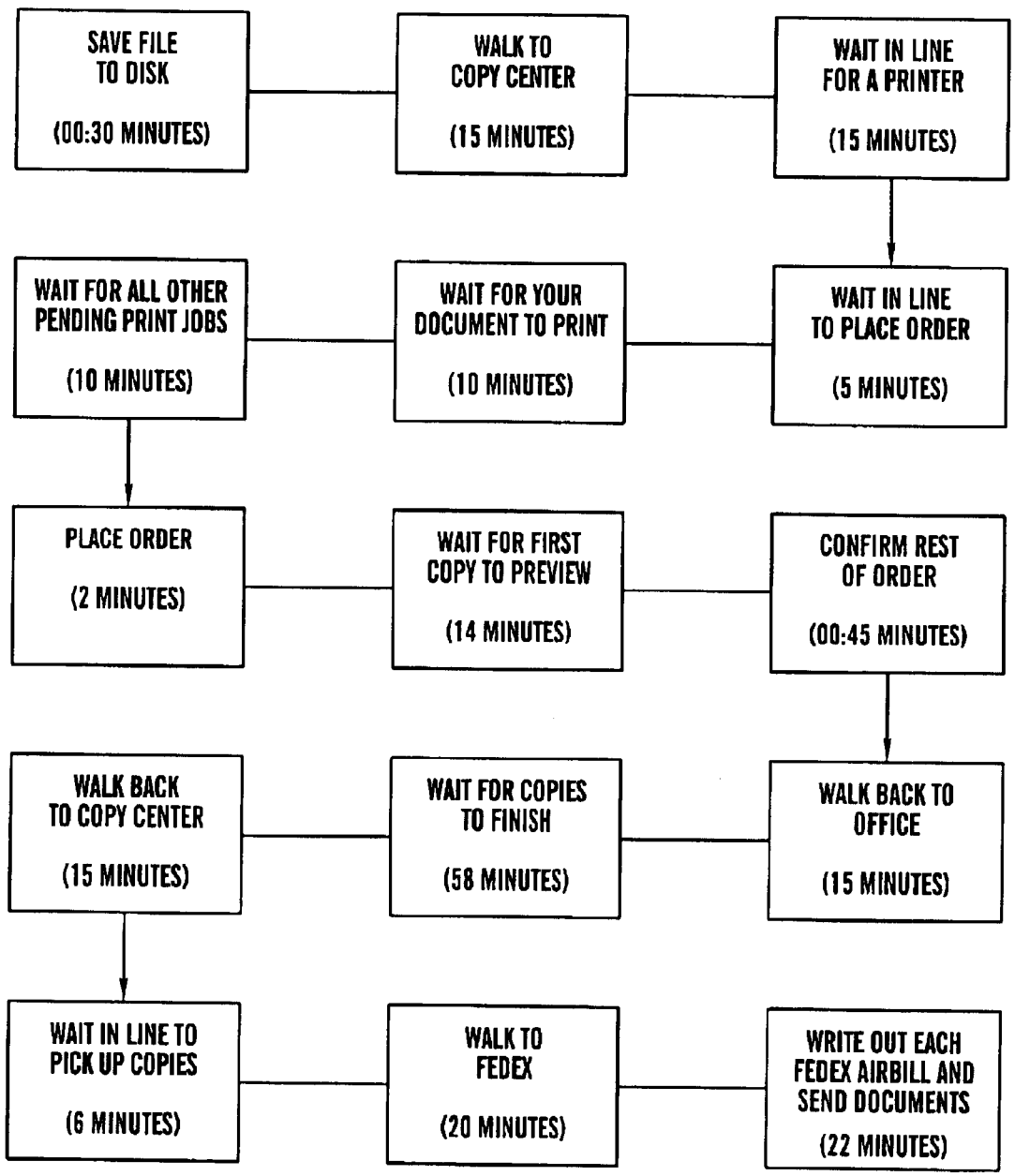
FIG. 1 illustrates a conventional process that a consumer must follow in order to copy or reproduce a document.
Figure 2A:
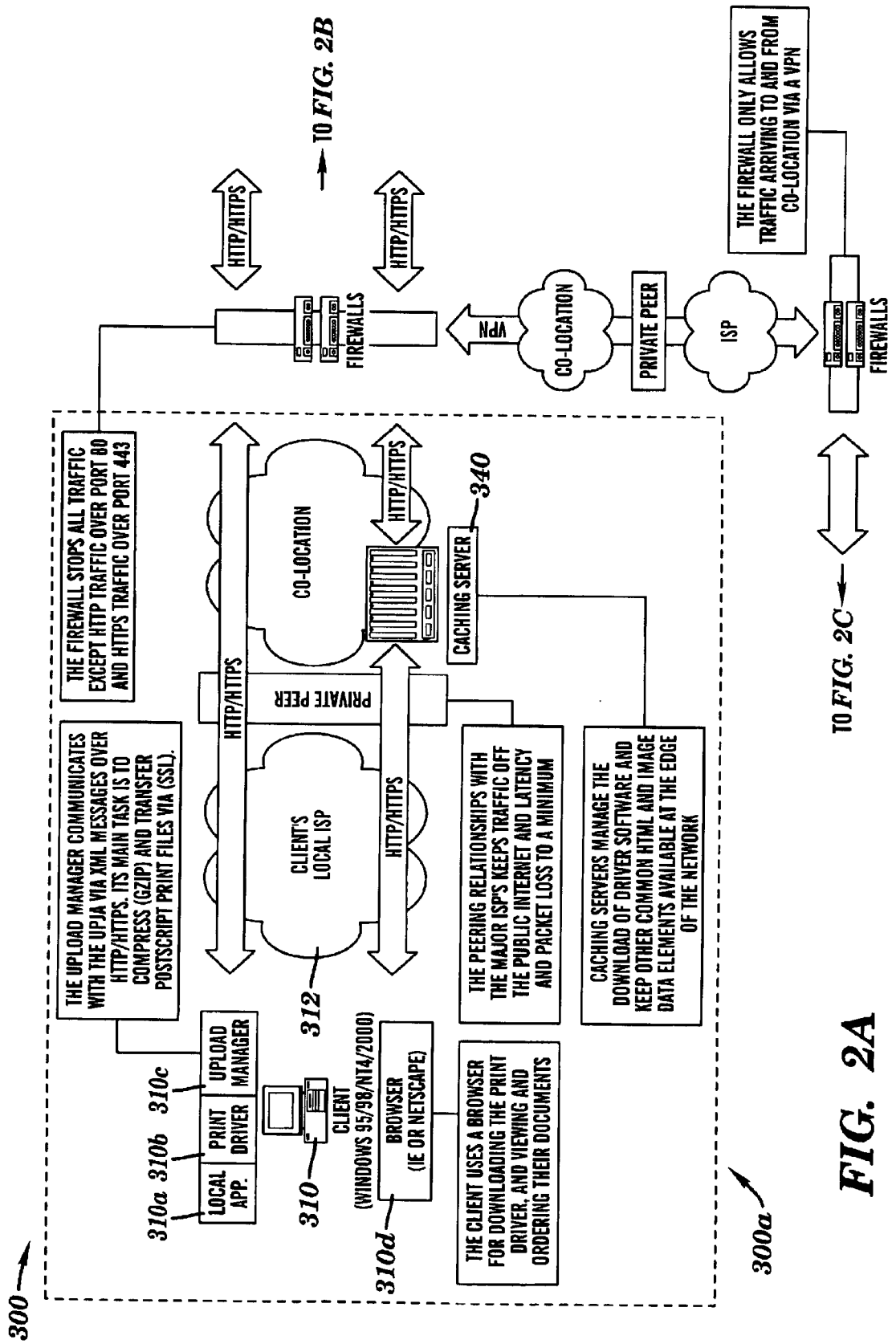
FIG. 2 illustrates an exemplary network of the invention.
Figure 2B:
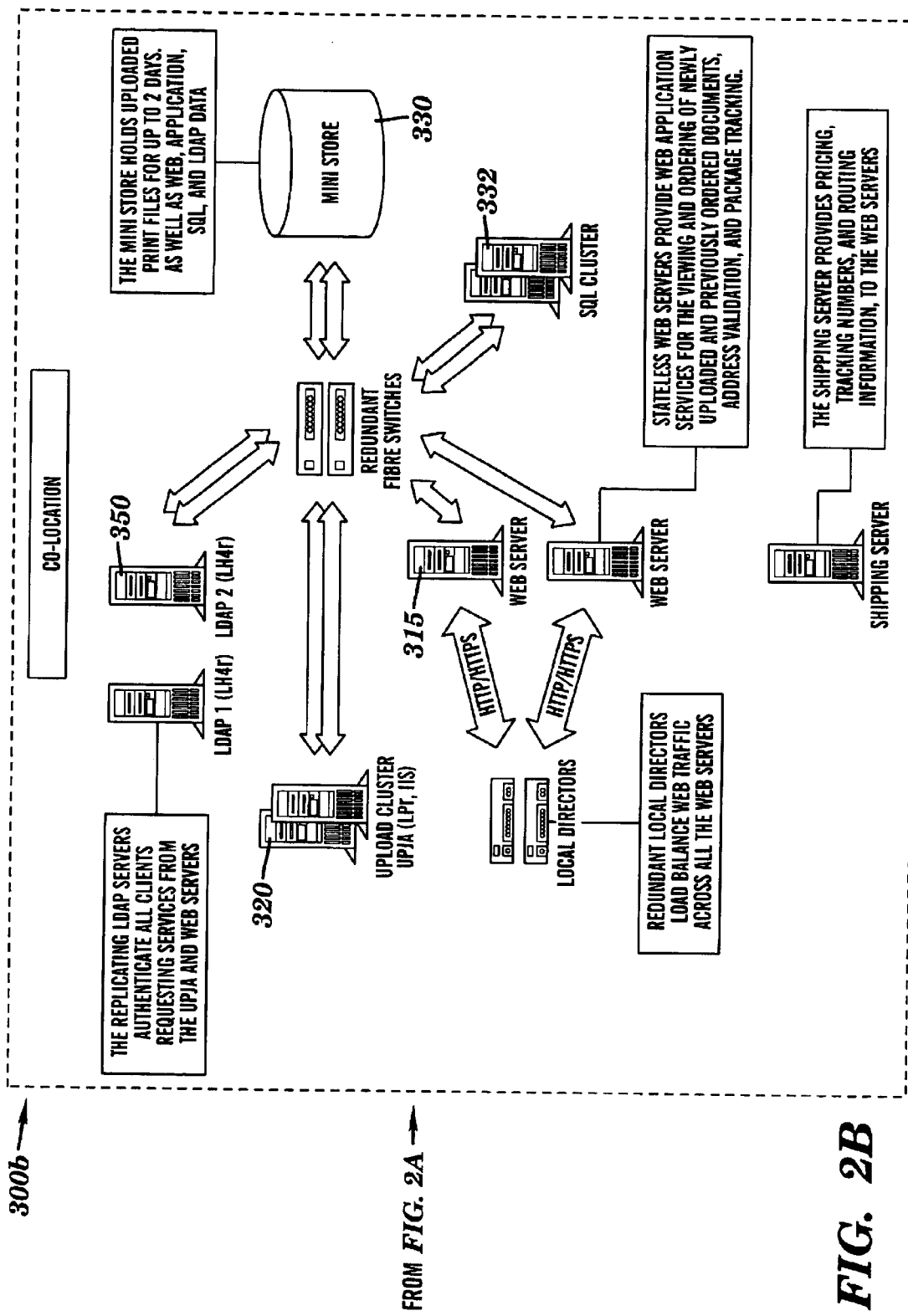
Figure 2C:
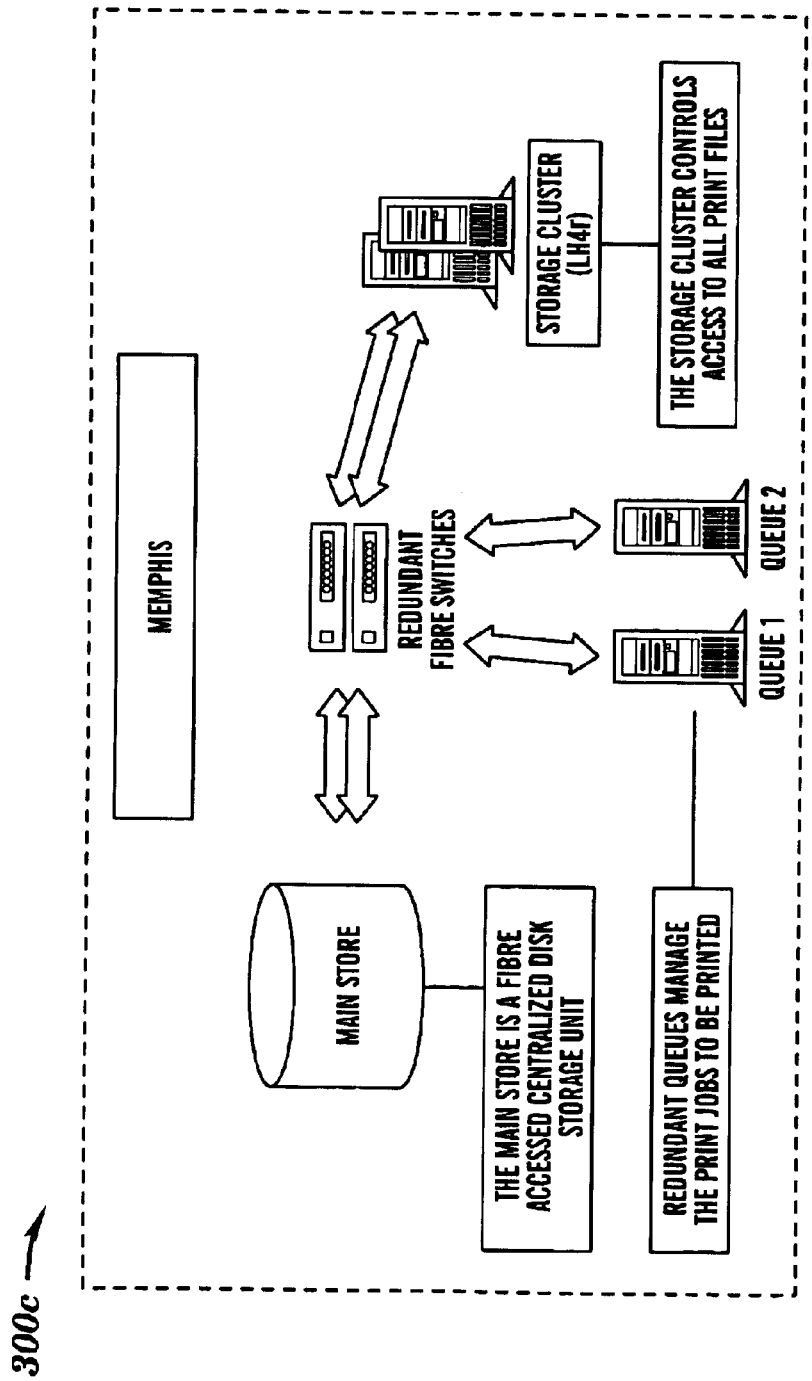

Communication of data occurs over a network, such as a LAN, WAN, internet, or the network illustrated in the various Figures. FIG. 2 illustrates an exemplary network of the invention. The network 300 illustrated in the FIG. 2 includes, for example, a client 310, a local internet service provider (ISP) 312, a universal print job acceptor ("UPJA") 320, a storage unit (e.g. a mini store) 330, and multiple web servers 315. Connection to the network 300 can also occur, for example, by modem or dial-up telephone connection, or as readily understood by one having skill in the art. The network 300 described in FIG. 2 is exemplary and can be modified as readily understood by one having ordinary skill in the art.

The network 300 can be divided, for explanatory purposes, into three sections: the client side of the network 300a, the back end side of the network 300b and the printing side of the network 300c. Communication between the client side 300a, the back end side 300b and the printer side 300c occurs, for example, through the network 300. As illustrated in FIG. 2, added levels of security, such as use of firewalls, ensure that information sent over the network 300 is not disturbed (e.g. the information is not modified, changed or breached). Generally speaking, a user on the client side 300a of the network can request printing from, for example, a personal computer, and generate a document for shipping and/or delivery from printer side 300c. The back end side 300b of the network 300b is transparent to the user.

Figure 3:
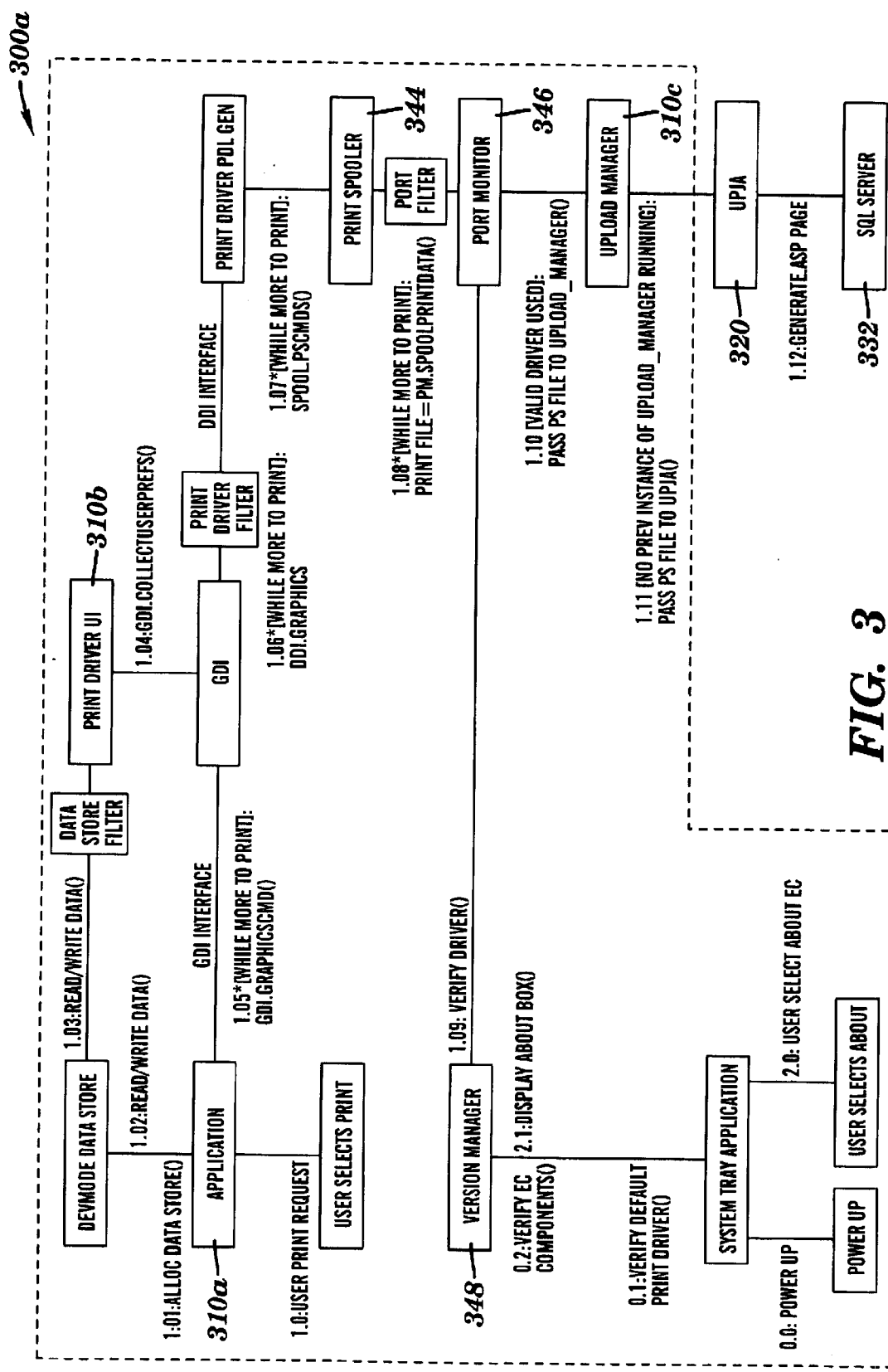
FIG. 3 is an exemplary diagram of an embodiment of the system in the invention.

FIG. 3 is an exemplary diagram of an embodiment of the system in the present invention. FIG. 3 primarily illustrates the client side 300a of the network 300, with the addition of the UPJA and SQL server which are on the back end side 300b of the network 300. The system includes, for example, a DevMode Data Store, a Print Driver UI, a local application, a GDI, a Print Driver PDL Gen, a Print Spooler, a Port Monitor, an Upload Manager, a Universal Print Job Acceptor (UPJA), a SQL server, a Version Manager, and a System Tray Application which allows power up and user selection of icons.

First, relevant file information (parameters) will be sent from the spooler 344 via the port monitor 346 and upload manager 310a to a web server 320 (e.g. UPJA). The relevant file information includes, for example, a handle identifying the location of the printer, printer name, job id, printing level, and document information such as color, stapling, etc. After the relevant file information is sent to the port monitor 346, a check is performed to determine whether a valid component (e.g. a print driver 310b) is being used, for example, to print the document. In the preferred embodiment, the print driver resides as a file on the client, and comprises Windows™ based code. The print driver 310b may be installed, for example, by downloading it from a server or installed from disk. In order to validate the print driver 310b, the name of the print driver 310b is sent to the version manger 348, and a check (e.g. a CRC) is performed to compare the components of the print driver stored in the file with information stored in a registry. The registry includes, for example, predetermined information which can authenticate that a valid print driver is being used. If the comparison results in an invalid print driver, the data file (document) will not be sent (uploaded) to the web server. If, on the other hand, the comparison results in a determination that the component (print driver) is valid, then the data file is sent from the print spooler 344 to the port monitor 346. The data file is sent, for example, as packets of information from the print spooler 344 to the port monitor 346. In this embodiment, it is preferable that the packets of data are sent in 4 Kbyte packets. Once the entire data file has been sent to the port monitor 346, the entire data file is sent, via the upload manager 310c, to the UPJA 320 and stored. The upload manager 310c then launches a web browser 310d for viewing the document.

In one embodiment of the invention, an object (e.g. a filter) may. be placed in between two other objects (e.g. the Print Spooler and the Port Monitor). The filter can be used, for example, to detach the port monitor 346 from the Print Spooler 344, allowing the system to easily upgrade object code for future versions of software. The filter would preferably be a proxy filter. Other embodiments may include a data store filter in between the DevMode Data Store and the Print Driver UI, and a Print Driver Filter in between the GDI and the Print Driver PDL Gen.

With reference to FIGS. 2 and 3, the client 310 (e.g. a terminal, personal computer, PDA, mobile phone, etc.) stores, for example, local applications 310a such as Word™ or PowerPoint™, print drivers 310b, a port monitor 346, an upload manager 310c and a browser 310d. The local applications 310a can be used to create or download a document (the term "document" is being used to broadly refer to any data or information that can be transmitted over the network 300) that the user can ultimately forward to the print side 300c for shipping and/or delivery to a specified location. Print driver 310b builds and creates objects necessary to communicate with the selected printing device (e.g. a printer directly attached to the client 310, a printer on the network 300 or a printer located at the printer side 300c). The upload manager 310c is responsible for compressing and transferring files (e.g. documents) over the network. The browser 310d, such as Internet Explorer™ or Netscape Navigator™, is used to download print drivers 310b, and to view and order documents. Downloading of this data preferably occurs prior to requesting a print job. Of course, other systems and methods may be used to browse and download print drivers and view or order documents as one having ordinary skill in the art would recognize. For example, print drivers 310b may be loaded onto the client 310 by reading software stored on a recordable medium. The upload manager 310c communicates with the UPJA 320, for example, via Extensible Markup Language (XML) messages over http/https. XML allows browser clients to download an HTML page and then manipulate the page off line, without referring back to the server. The main task of the upload manager 310c and UPJA 320 is to transfer and compress files (preferably secure PostScript print files) via, for example, a Secure Socket Layer (SSL).

Operation of the upload manager 31Oc is now described. The upload manager 310c, which resides on the client 310 and is software in the preferred embodiment, handles upload and recovery of data for print jobs on the network 300. Once a complete document has been uploaded and transmitted to a server for reproduction processing, the upload manager 310c launches a web browser that allows a user to view and edit the document. For software including version information, the upload manager 310c can determine which version of the software is supported by the system and can monitor the data to determine whether a valid version of the software is being used, as described below.

A caching server 340 manages the download of driver software and other common HTML and image data elements between the client 310 and the UPJA 320. The UPJA 320 (which is a server in the preferred embodiment and therefore includes the conventional components of a computer, including memory, storage and a process), in one embodiment, receives the document as it is transmitted from the client 310, via the ISP 312, across the network 300. The document is received by the UPJA 320, via the upload manager 310c, after the print driver 310b being used has been authenticated by the version manager 348, and the entire document has been sent to the port monitor 346. Replicating servers 350 (i.e. lightweight directory assistance protocol, or LDAP, servers) authenticate clients 310 requesting services from the UPJA 320 and web servers 315. Authentication occurs as is readily understood by one having ordinary skill in the art. For example, the web servers 315 provide application services for web browsing and viewing of order information of newly uploaded and previously ordered documents. Software, such as AlchemyPS, is used to render "gif" images of the PostScript document for viewing. The mini store 330 stores documents (i.e. files) uploaded to the UPJA 320, as well as web, application, SQL and LDAP data.

Figure 4:
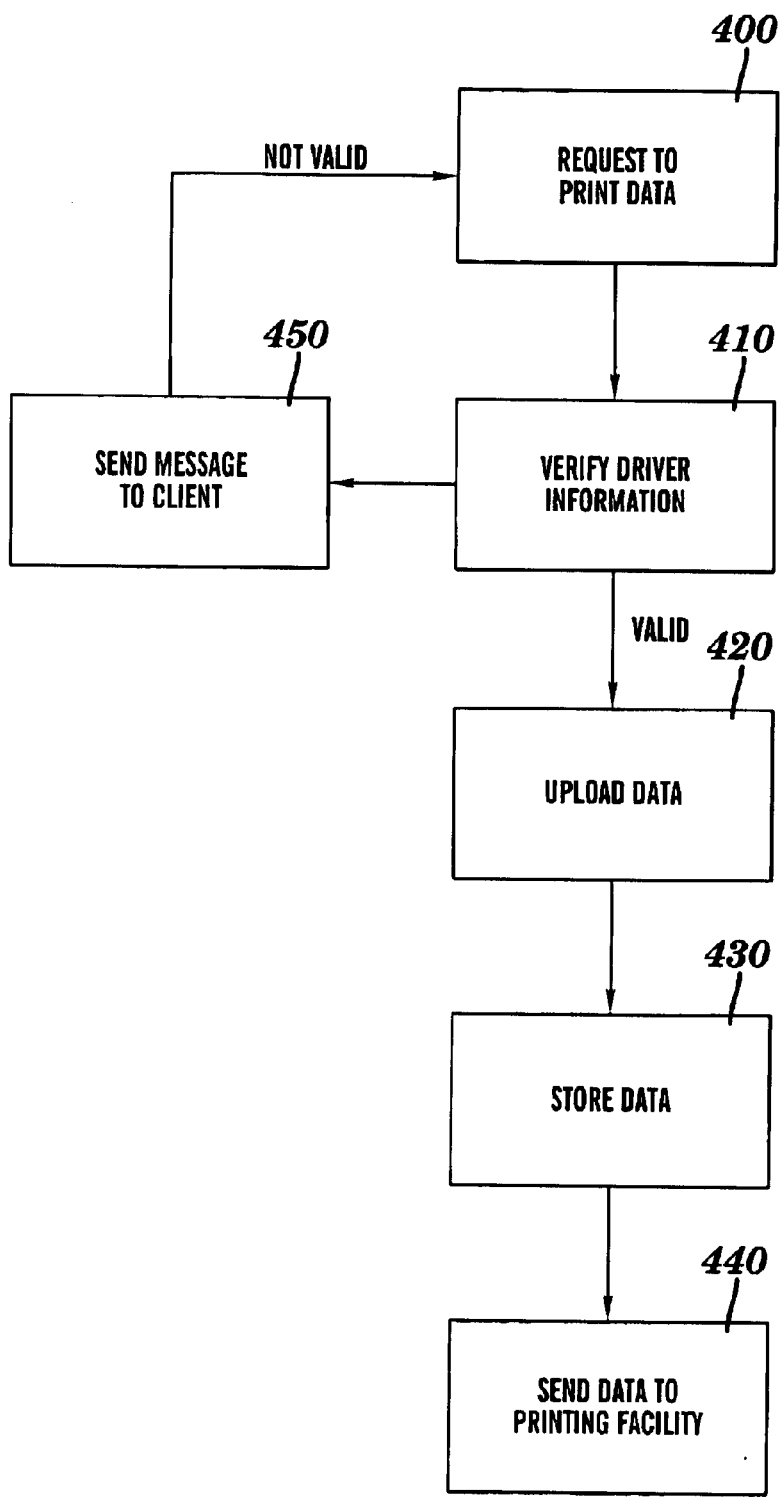
FIG. 4 illustrates an exemplary diagram of a user requesting a file to be printed using the system and method of the invention.
Figure 5:
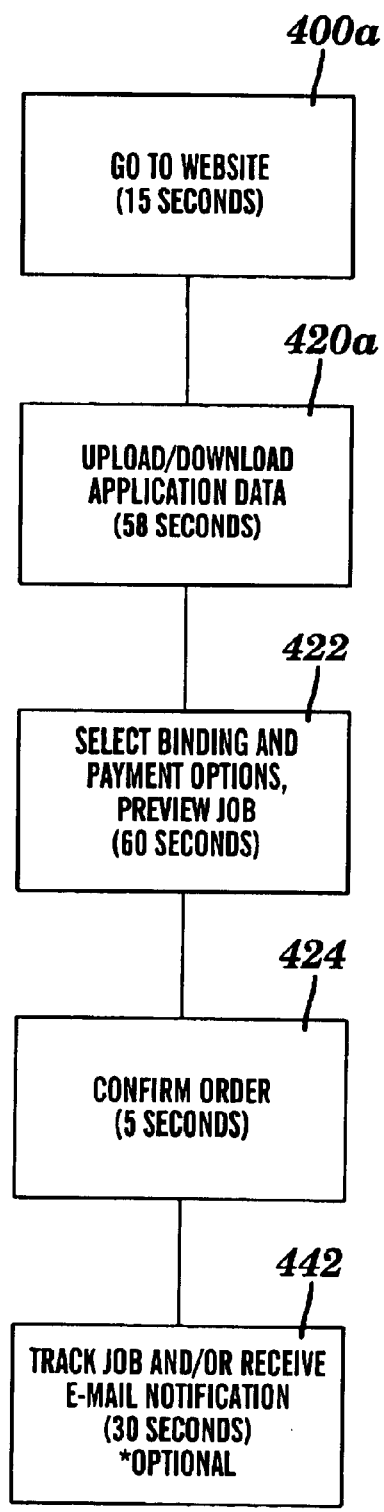
FIG. 5 illustrates an exemplary diagram of a user requesting a file to be printed using the system and method of the invention.

After a document has been sent to the UPJA 320, it can be downloaded to the printer side 300c. The printer side 300c allows the user on the client side 300a to print, bind and deliver documents that have been uploaded and stored on the network 300. The physical location of the print side 300c can be anywhere relative to the client side 300a and back end 300b. In the preferred embodiment, print side 300c is located in a printing facility next door to a delivering company such as Federal Express™. Documents are downloaded to a storage unit (e.g. main storage) located on print side 300c, as illustrated in FIG. 2, and then replicated on printers for ultimate shipping and delivery of the completed product to an address or location specified by the user. The completed product is an actual representation of the virtual product created by the user on the client side 300a. For example, a user may select a file that has been created using a standard editor such as Word™. The file may then be edited or modified by selecting font size and color, binding and paper using the interface opened by browser 310d. More specifically, FIGS. 4 and 5 illustrate exemplary diagrams of a user requesting a file to be printed using the system and method of the present invention. Operation of the system and method are discussed below.

Referring to FIG. 4, a user requests data to be printed at 400. After data (i.e. a document) has been selected at 400, the user may configure the settings of the document using a configuration unit (e.g. the item configuration wizard), as described below. Before uploading the selected document(s) to the UPJA 320, the print driver 310b selected by the user is verified by the version manager 348 at 410. If the version manager 348 determines that the:print driver is not valid (i.e. not acceptable), then a message is sent to the client 310 at 450, and the process begins over. If, on the other hand, the version manager 348 determines that the print driver information is valid, then data is uploaded from the client 310, for example, to the port monitor 346 via the print spooler 344 (see, for example, FIG. 37. That is, when data being uploaded includes version information, the upload manager 310c can query about, for example, what version of software the system supports. For example, when a "print" command is issued, the upload manager 310c can monitor, in real time, the data to determine if a valid version of the print driver 310b (e.g. driver software) is being used. The upload manager 310c also verifies that the client 310 software (e.g. local applications), and/or components making up the software, represent a coherent set of components and work properly together. This can be accomplished, for example, by a version manager 348 authenticating the components of the drivers and client software.

Uploading a document begins at 420. The upload manager 310c compresses the document(s) that has been selected for printing, and sends it to the UPJA 320 for storage (preferably temporary) at 430. One having ordinary skill in the art will recognize that documents can be transferred in a variety of ways, and the present invention is not limited to the preferred embodiment. Documents sent to UPJA 320 may also be stored in mini store 330 for later retrieval at 430. Finally, the document is sent to printer side 300c where it is stored in a main storage unit, and printed according to the user defined specifications at 440.

As illustrated in FIG. 5, subsequent to uploading a document in 420, in one embodiment users can specify with the aid of a configuration wizard, the item, for example, document type, paper stock, printing options, double or single sided copies, color versus black and white, cover and orientation (422). The user is then presented with the option of either viewing their shopping cart and choosing an item (e.g. another document) to be purchased for printing, or can select the number of copies to be printed (422). After the selection of the number of copies has been made, the user can select the appropriate address or location for delivery of the printed document, convey billing information, preview and submit the order, and receive confirmation and updates regarding the order (424 and 442).

Figure 6:
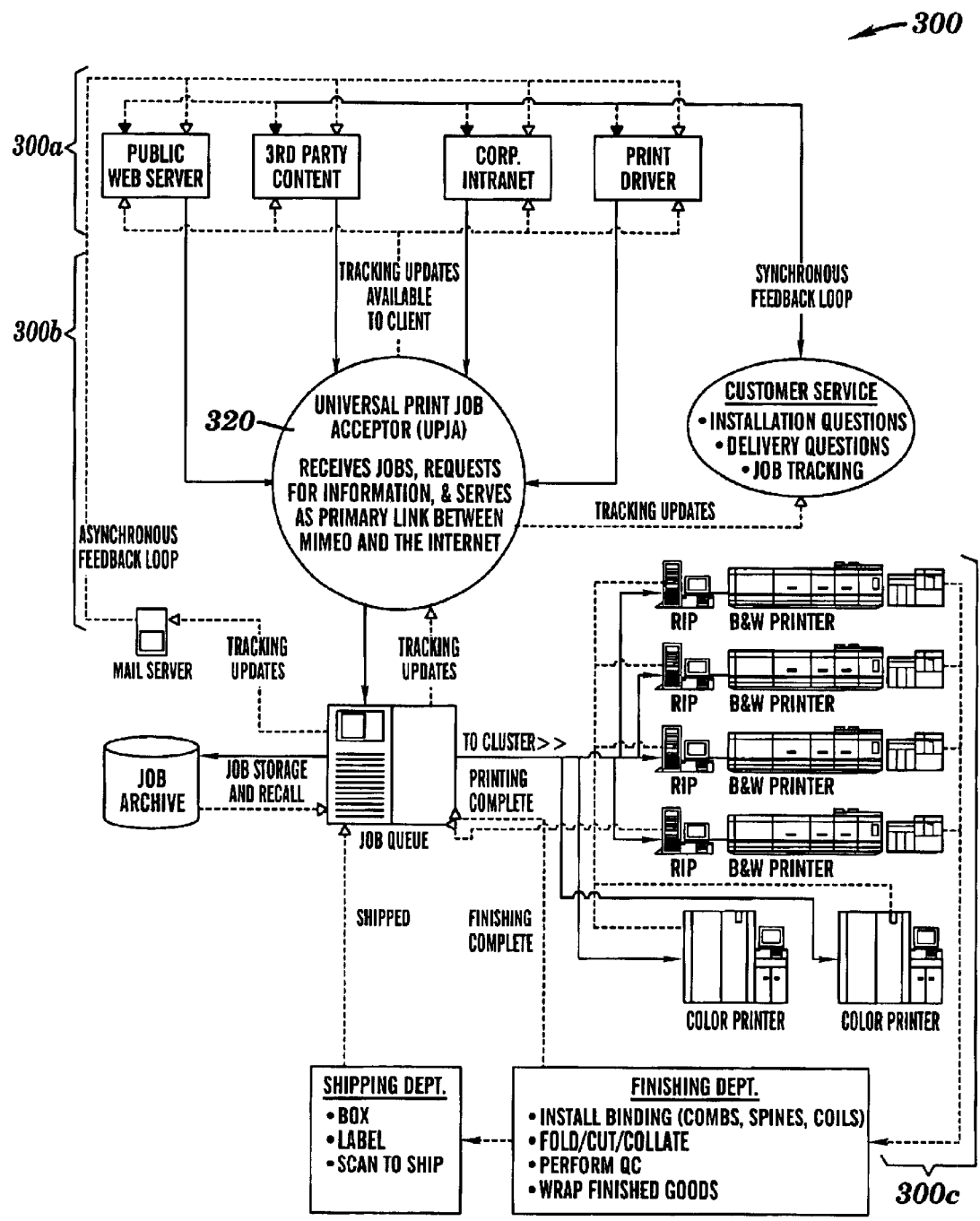
FIG. 6 is an exemplary diagram illustrating one embodiment of the system of the invention.
Figure 7A:
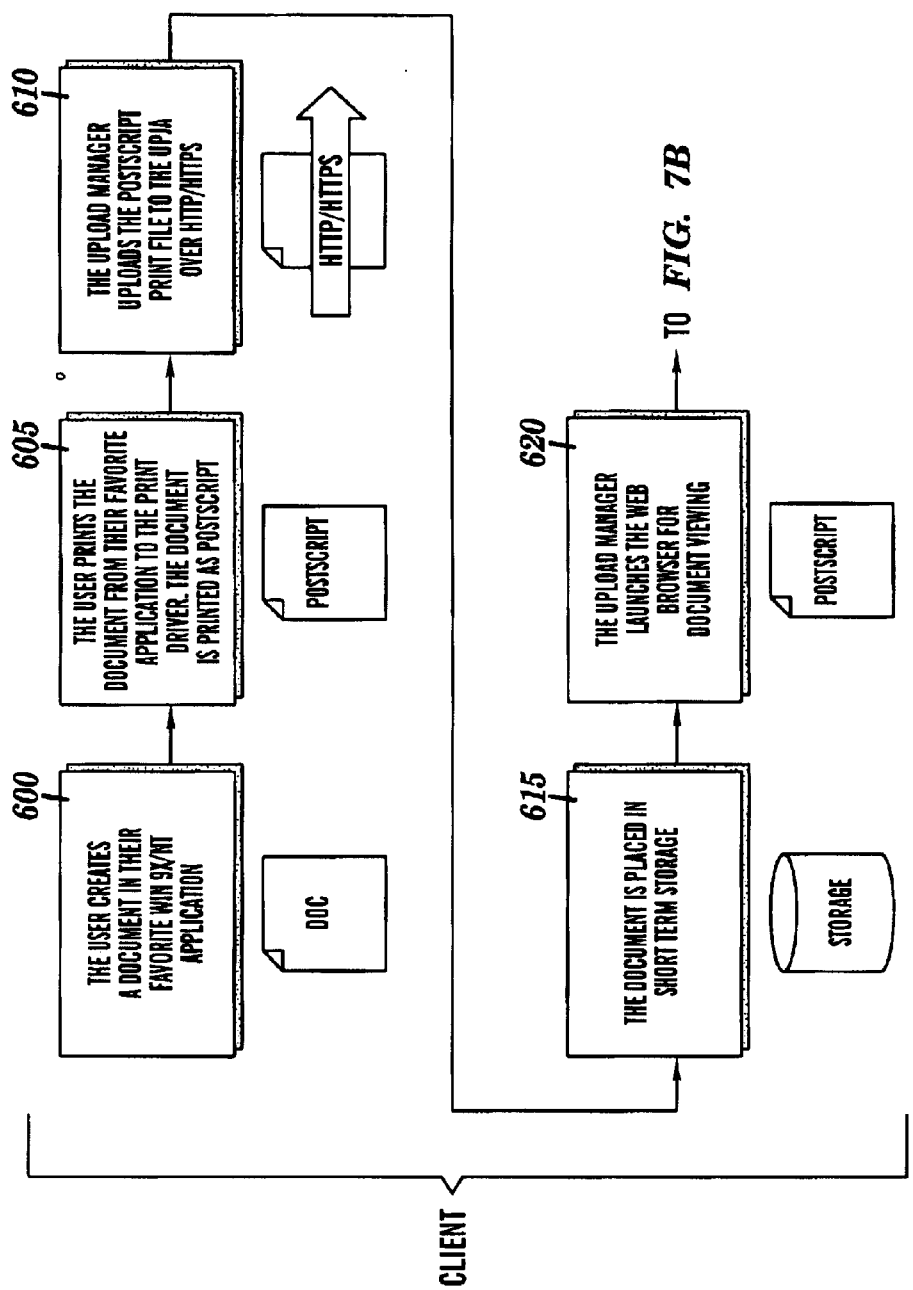
FIG. 7 is an exemplary flow diagram of a method of using the system of the invention.
Figure 7B:
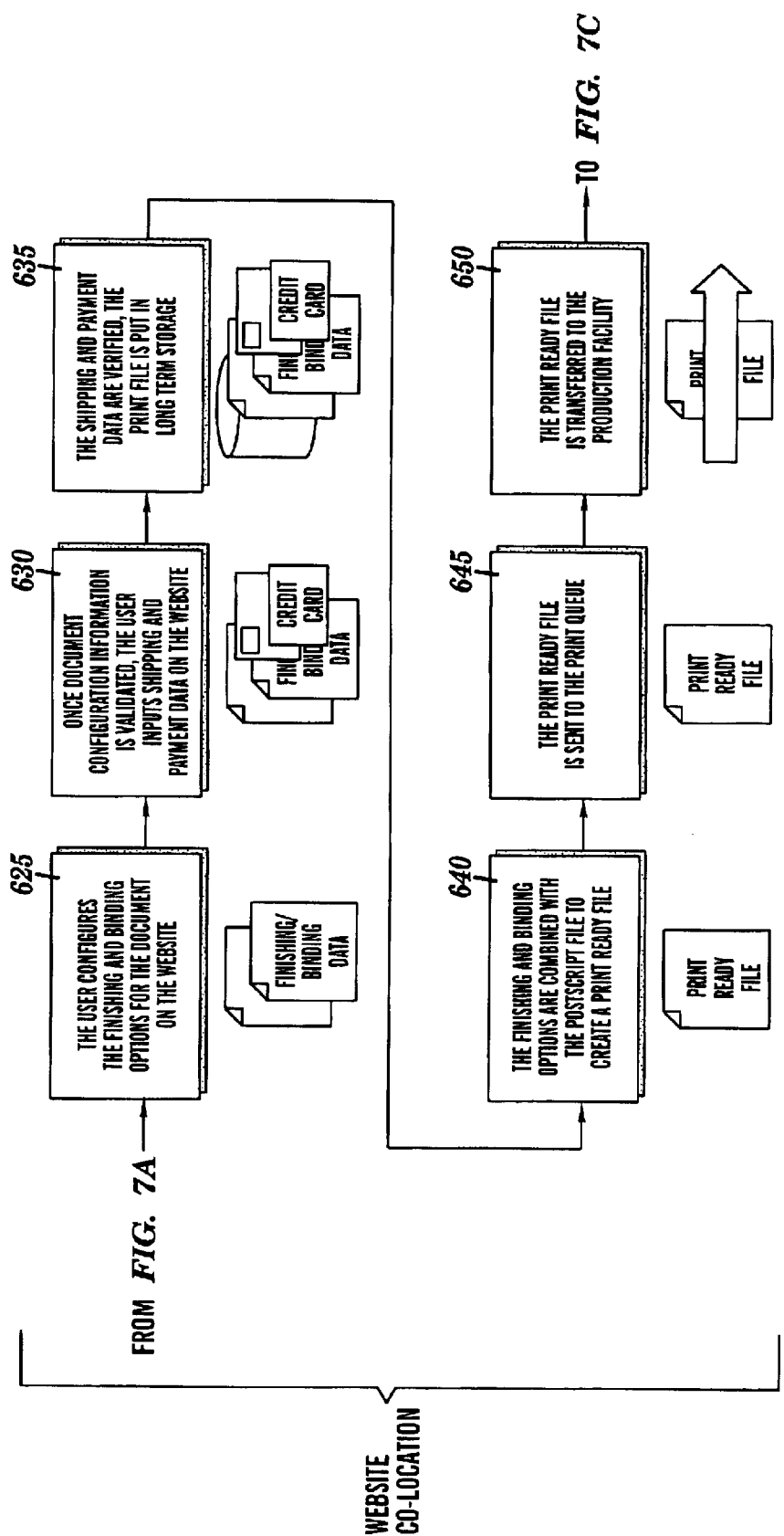
Figure 7C:
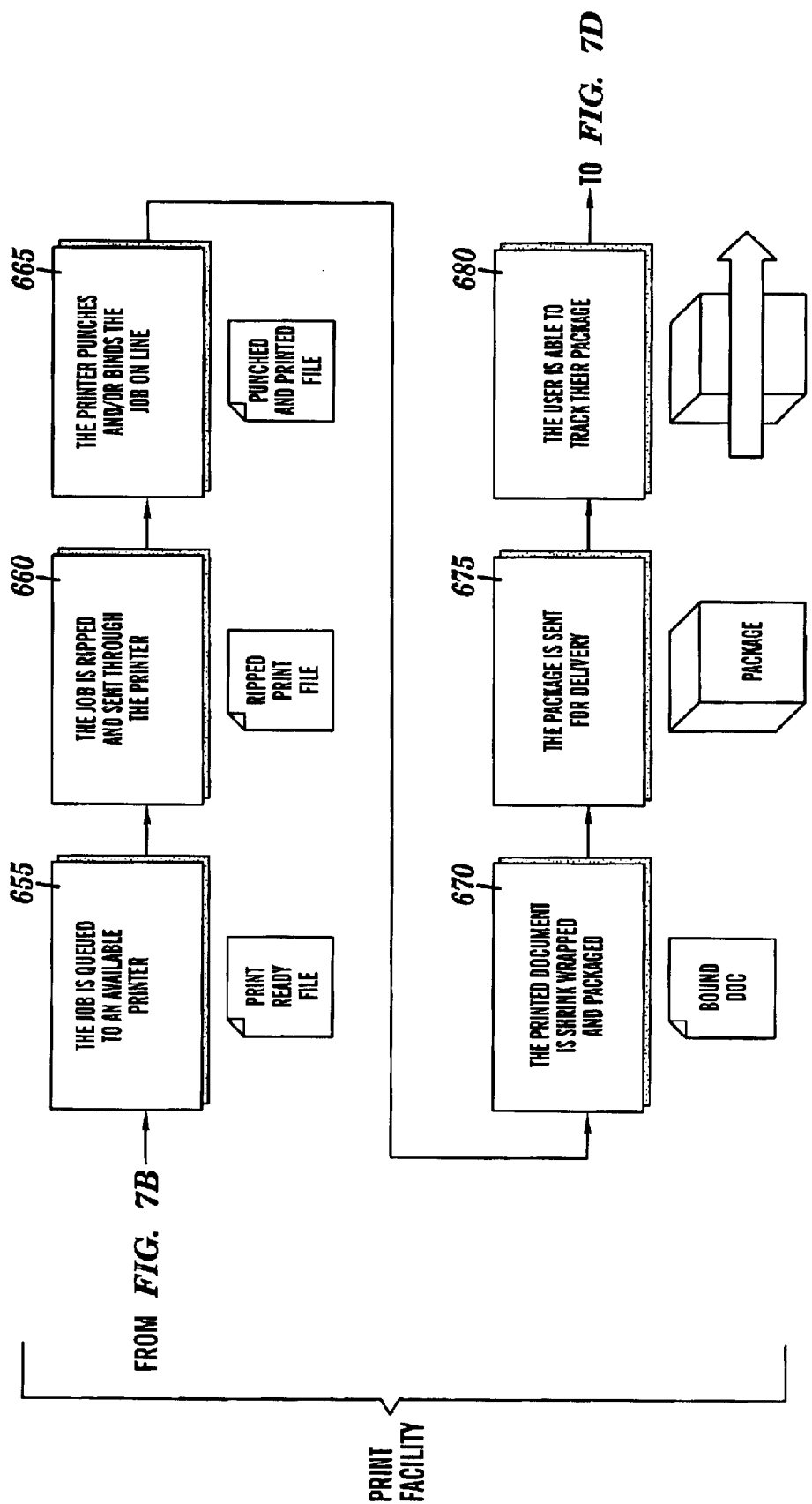
Figure 7D:
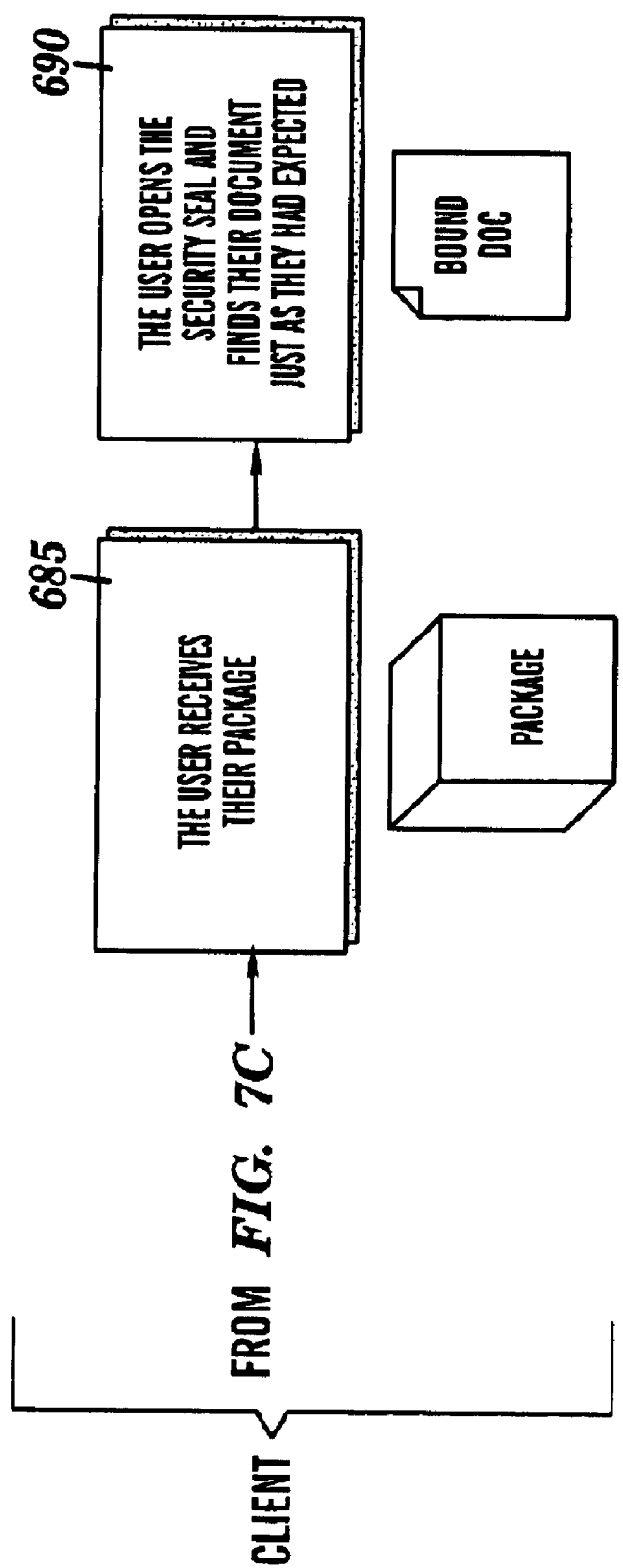

FIG. 6 is an exemplary diagram illustrating one embodiment of the system of the invention. The network 300 includes; for example, client side 300a, back end side 300b and print side 300c. The client side 300a includes a public web server, third party content, a corporate Internet and a print driver. Each of these components can freely communicate with each other and with the UPJA 320 on back end side 300b. The UPJA 320, as described above, can receive jobs, requests for information, etc., and serves as the primary (although not necessarily the exclusive) link between the client side 300a and the print side 300b. The back end side 300c includes a main storage to store documents downloaded from the UPJA 320, a job queue, workstations and printers to complete the ordered jobs. Servicing on the completed jobs can also be handled at the print side 300c, or at a separate location. Servicing includes, for example, binding, cutting, collating and wrapping the documents to be shipped, as well as boxing, labeling and shipping or delivery of the document(s) to a specified address or location.

FIG. 7 is an exemplary flow diagram of a method of using the system in the invention. The flow illustrated is merely an example of one embodiment of a process that a user accessing the system may perform. The user creates a document in a local application 310a on, for example, their personal computer (600), and prints the documents from the application to the selected print driver 310b (605). The document is printed as a postscript document (610). The upload manager 310c then uploads the postscript print file to the UPJA 320 over http/https (615), and the upload manager launches the web browser 310d for document viewing (620). The user can then configure the finishing and binding options for the document using the interface on the personal computer (625). Once document configuration information is validated, the user inputs shipping and payment data on the interface(630). The shipping and payment data are verified, and the print file is put in long term storage (635). The finishing and biding options are then combined with the postscript file to create a print ready file (640), and the print ready file is sent to the print queue (645) and transferred to the production facility (i.e. printing facility). A printer operator can then select a job and queues it to an available printer (655), and the job is ripped and sent to the printer (660). The printer punches and/or binds the job on-line (665), and the package is sent for delivery (675). The user is able to track the package, receive the package and open the package (680–690).

Figure 8:
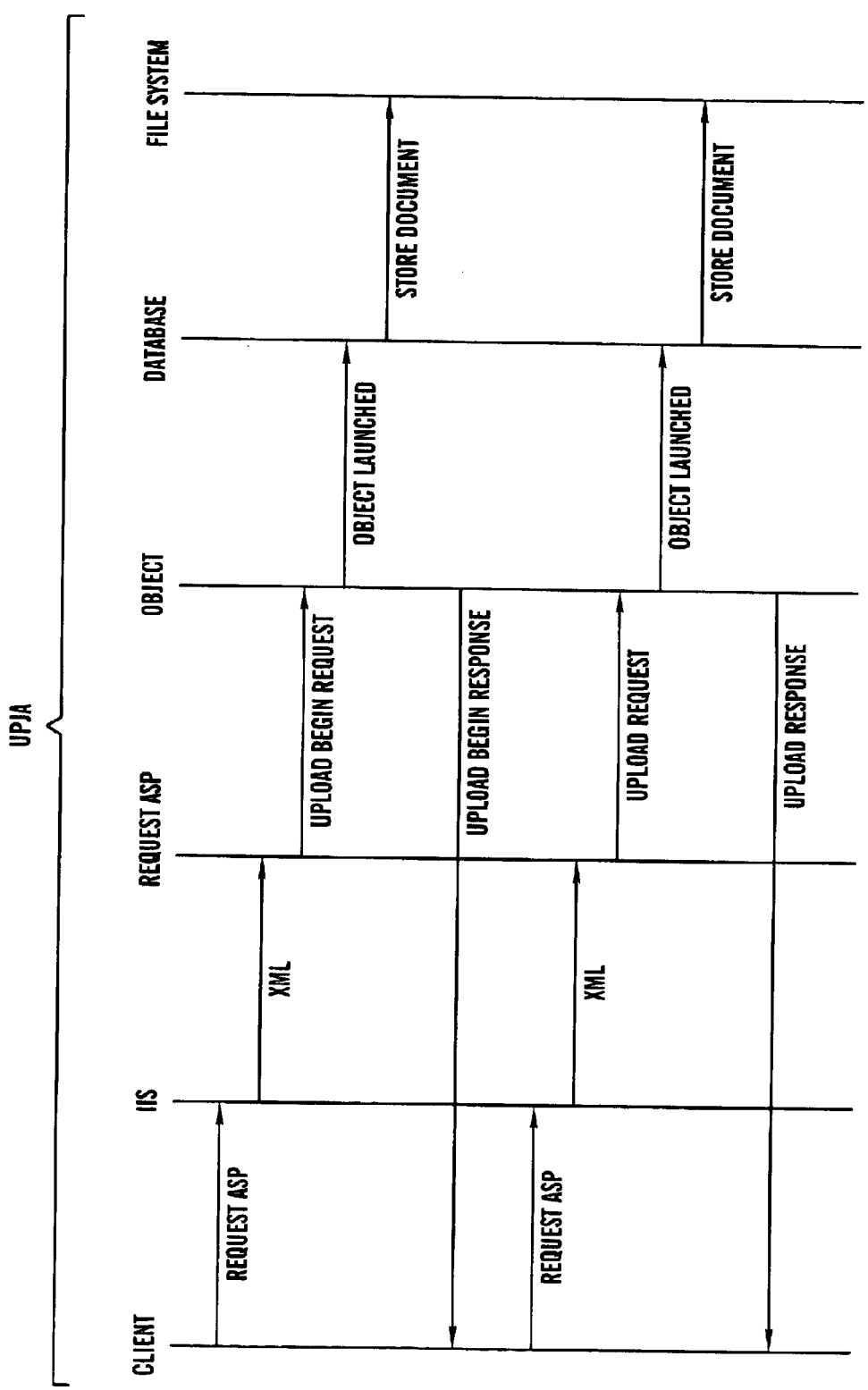
FIG. 8 is an exemplary flow diagram of the operation performed by the upload manager.

FIG. 8 is an exemplary flow diagram of the operation performed by the upload manager. A client's "upload request" is sent via, for example, an XML protocol such as a Java active server page (ASP) to a server, such as the UPJA 320 depicted in FIG. 3. The server creates an "upload.begin" request ASP and an associated object identifying the request. The object is sent to a database and stored. In response, the object initiates an "upload.begin" response, which is transmitted to the client 310 via, for example, XML. This process repeats for each client upload request. Further details of the processing performed relative to uploading an entire document are described below relative to FIG. 5.

Figure 9:
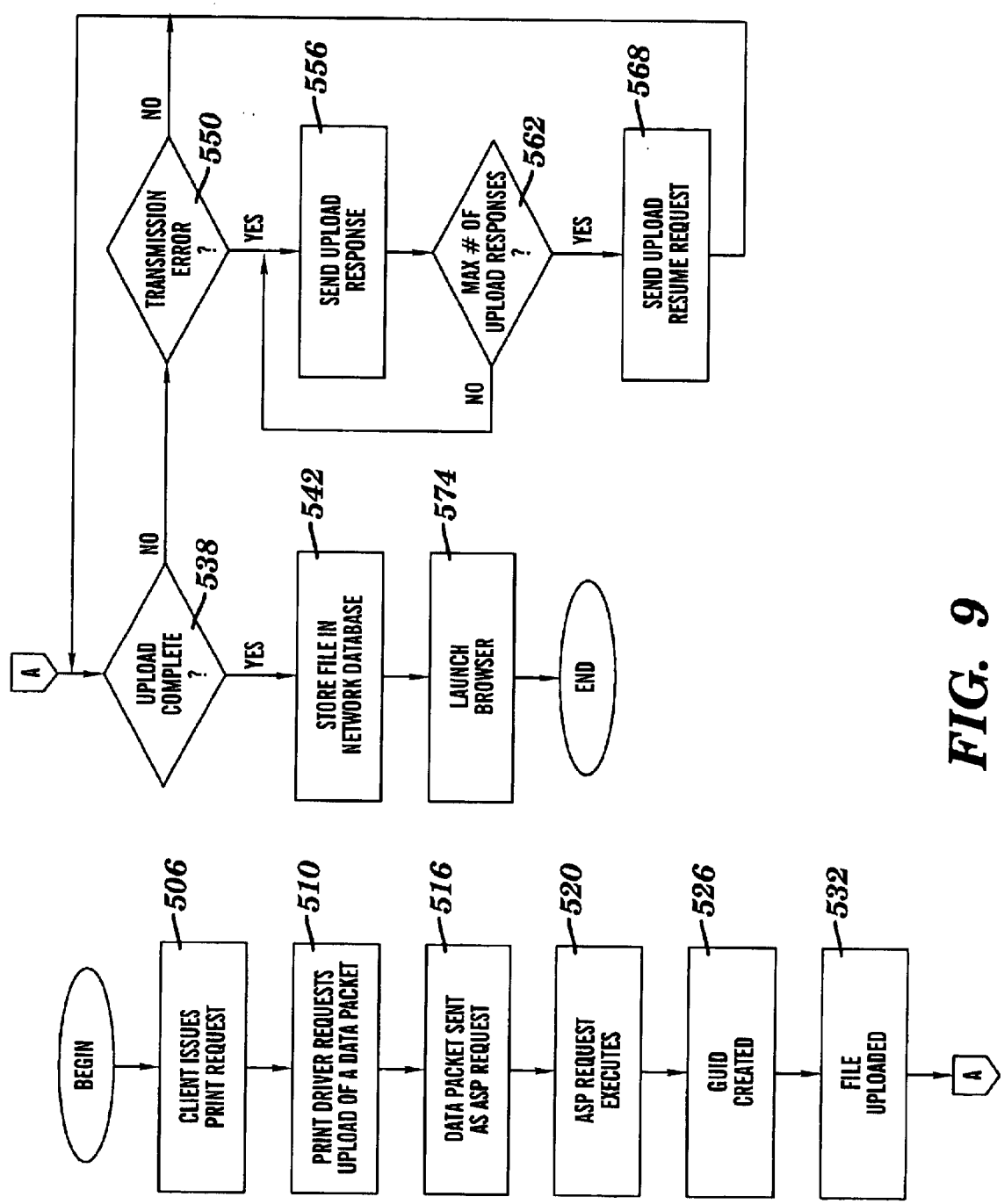
FIG. 9 is an exemplary flow diagram of uploading a document.

FIG. 9 is an exemplary flow diagram of uploading a document. Referring to FIG. 9, the transfer of information across the network 300 begins with a request by the client 310, for example, a command to print a file at 506. The print driver 310b residing, for example, on the client 310 makes a request to upload a data packet at 510. The data packet is sent as an ASP request to web server 315, such as aIIS Windows-based web server at 516. The request may be, for example, an "upload-begin" request, an "upload-request" or an "upload-complete-response."

The ASP provides the server-side equivalent to using a scripting language and objects on the client 310. When the print driver 310c makes the request to upload a data packet, the client 310 keeps track of which data packet(s) has been sent. That is, the data packet is "marked" for subsequent reference. If a problem occurs in the transmission, for example a modem failure, machine failure, the internet goes down, a database goes down, the file is corrupted, etc., or if the file is successfully transmitted, the system can properly respond to the client 310. For example, if the file is successfully transmitted, the client 310 is notified of the successful transfer. If, on the other hand, a transmission error occurs, the network 300 is able to identify which data packet was last sent using the marked reference. In this regard, the system can continue, i.e. resume, uploading from the point of error, without having to resend or retransmit the entire data file.

The ASP request then executes at the server 315 and launches associated objects stored in the server at 520. After the ASP request executes, an initial handshake occurs between the client 310 and server 315. During the initial handshake, an object is launched to create a new globally unique identification (GUID) of the file at 526. The newly created GUID is then sent to the client 310 as an "upload-begin-response" and is used for subsequent "upload-request" uploading of the file. Uploading of the file then begins and information about the file, such as file size, CRC, document names, color, orientation and number of pages, is transferred to the UPJA 320 at 532. Once the entire file and corresponding file information is transferred to and stored in the UPJA 320 at 538, it is transferred and stored in a computer readable medium, such as, a mini store 330 at 542.

If at any time during the transfer of data an error occurs, an "upload-response" is sent to the client. The response indicates to the client 310 that an error during transmission has occurred at 550. The client 310 responds to the "upload-response" by re-transmitting the packets from a point at which the last packet was successfully sent at 556. This re-transmission process can be repeated for a predetermined number of times. If an error is still present after the system has re-tried the predetermined number of times at 562, then an "upload-resume" request is initiated at 568. The "upload-resume" request transmits the GUID to the upload manager 310c so that the upload manager 310c can determine which file the upload resume request relates to. The upload manager 310c then determines the last referenced, or "marked," data packet and resumes the transfer of data beginning with that packet. The data packets are transmitted until the entire file has been successfully transferred to the server.

Once the complete file, along with corresponding file information, has been transferred to the server and stored, a browser 310d located at the client 310 is launched at 574. The browser 310d allows the user to view, configure, format, print, etc. the uploaded document as described above.

Although the invention has been described relative to a particular embodiment, one of skill in the art will appreciate that this description is merely exemplary and the system and method of this invention may include additional or different components. This description is therefore limited only by the appended claims and the full scope of their equivalents.

What is claimed is:

1. A method for delivering a document over a network, comprising:

providing a print driver to be selected by a user from an application residing on a client in order to print the document;

authenticating the print driver by comparing information about the selected print driver with predetermined information;

uploading the document from the client to a storage unit via the network, after print driver information is verified;

storing the document, including relevant document information, in the storage unit;

downloading the document from the storage unit to a facility for printing; and delivering the document at the facility to a location based on the relevant document information.

2. A system for delivering a document over a network, comprising:

an interface on a client to download a print driver from the network, the print driver creating a print file from the document;

an authentication manager to verify that the print driver is valid by comparing predetermined information with components of the print driver;

an upload manager, residing on the client, managing uploading of the print file over the network and launching the interface for viewing the document;

a web server to receive the print file uploaded from the client, the print file including file information; and a printing facility downloading the print file from the web server and delivering the document to a specified address.

3. The system according to claim 2, wherein the file information includes at least one of a handle identifying the location of the printer, a printer name, a job identification, a printing level, color information, binding information, finishing information, a number of copies, a file size, a cyclic redundancy code, a document name, a paper stock, printing options, orientation, double or single sided printing, or other relevant document information.

4. A method for delivering a document over a network, comprising:

downloading a print driver located on a client from the network, the print driver creating a print file from the document to upload over the network;

verifying that the print driver is valid by comparing predetermined information with components of the print driver stored in the document;

launching an interface for viewing the document;

receiving the document uploaded from the client at a web server, the document including file information; and downloading the document from the web server and printing the document according at least to the file information.

\* \* \* \* \*